United States Patent [19]

Akiyama et al.

[11] Patent Number: 5,034,058
[45] Date of Patent: Jul. 23, 1991

[54] AQUEOUS INK COMPOSITION

[75] Inventors: Kazutoshi Akiyama, Matsubara; Takashi Ono, Takatsuki; Tatsuya Yagyu, Neyagawa, all of Japan

[73] Assignee: Orient Chemical Industries, Ltd., Osaka, Japan

[21] Appl. No.: 366,442

[22] Filed: Jun. 15, 1989

[30] Foreign Application Priority Data

Jun. 20, 1988 [JP] Japan .................................. 63-152893

[51] Int. Cl.$^5$ ............................................. C09D 11/02
[52] U.S. Cl. ........................................ 106/22; 106/20; 534/727
[58] Field of Search ..................... 106/20, 22; 534/727

[56] References Cited

U.S. PATENT DOCUMENTS

| | | | |
|---|---|---|---|
| 2,959,582 | 11/1960 | Shimmelschmidt et al. | 534/727 |
| 3,531,459 | 9/1970 | Chiddix et al. | 534/727 |
| 3,945,836 | 3/1976 | Miyata et al. | 106/22 |
| 3,945,837 | 3/1976 | Miyata et al. | 106/22 |
| 3,947,435 | 3/1976 | Pechmeze et al. | 534/727 |
| 4,091,021 | 5/1978 | Andrew et al. | 534/727 |
| 4,286,989 | 9/1981 | Kadehjian et al. | 106/22 |
| 4,287,121 | 9/1981 | Pechmeze et al. | 534/727 |

Primary Examiner—William R. Dixon, Jr.
Assistant Examiner—Helene Klemanski
Attorney, Agent, or Firm—Birch, Stewart, Kolasch & Birch

[57] ABSTRACT

The present invention provides an aqueous ink composition which has excellent physical properties in all aspects. More specifically, the present invention relates to an aqueous ink composition, comprising (a) an aqueous medium, and
(b) and azo dye which has a hydroxyl group and/or an amino group, and also has 1 to 4 phosphorus-containing groups represented by the formula;

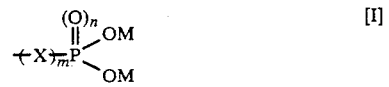

wherein x represents an oxygen atom or an alkylene group having 1 to 4 carbon atoms, M represents a hydrogen atom, an alkali metal atom or —NH(R)$_3$ (wherein R, which is the same or different, represents a hydrogen atom, an alkyl group having 1 to 3 carbon atoms or a hydroxyalkyl group having 1 to 4 carbon atoms), m represents 0 or 1, and n represents 0 or 1.

16 Claims, No Drawings

AQUEOUS INK COMPOSITION

FIELD OF THE INVENTION

The present invention relates to an aqueous ink composition which is excellent in writing and recording properties (especially smoothness of writing and recording), penetrating and fixing properties onto paper, discharging properties, lubricating ability and stability with time.

BACKGROUND OF THE INVENTION

An aqueous ink suitable for a ball-point pen and an ink-jet recording should have adequate stability with time, discharging properties, lubricating ability, water-resistance and light resistance, in addition to good writing and recording properties and good fixing properties of the written or recorded images. Conventional aqueous ink, however, has poor stability with time and lubricating properties, which often cause plugging of the pen tip and nozzle. In the case of a ball-point pen, the rotation of the ball is obstructed and a ball holder is worn resulting in a bad feeling during writing. In the case of ink-jet recording, the plugging inhibits discharging of the ink necessary to make the recorded letters and images distinct.

In order to obviate the above mentioned problems, many improvements have been done, for example, an aqueous ink containing a polyalkylene glycol derivative (Japanese Kokai Publication (unexamined) 65608/1979), an aqueous ink containing an unsaturated fatty acid (Japanese Patent Publication (examined) 3718/1982), an aqueous ink containing a phosphoric acid derivative (Japanese Kokai Publication (unexamined) 5773/1982 and 28472/1985) and an aqueous ink containing a polyoxyethylene fatty acid ester or a polyoxyethylene higher alcohol ether (Japanese Kokai Publication (unexamined) 143602/1975.

These inks try to improve the defects by formulating therein a modifying agent, such as a lubricating agent, a wetting agent or a water-resisting agent. The modifying agent is an improvement to a certain extent, but the obtained inks still necessitate some improvements.

SUMMARY OF THE INVENTION

The present invention relates to an aqueous ink composition which has excellent physical properties in all aspects. More specifically, the present invention relates to an aqueous ink composition, which comprises:
(a) an aqueous medium, and
(b) an azo dye which has a hydroxyl group and/or an amino group, and also has 1 to 4 phosphorus-containing groups represented by the formula;

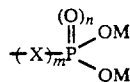
[I]

wherein X represents an oxygen atom or an alkylene group having 1 to 4 carbon atoms, M represents a hydrogen atom, an alkali metal atom or $-NH(R)_3$ (wherein R, which is the same or different, represents a hydrogen atom, an alkyl group having 1 to 3 carbon atoms or a hydroxyalkyl group having 1 to 4 carbon atoms), m represents 0 or 1, and n represents 0 or 1.

DETAILED DESCRIPTION OF THE INVENTION

The aqueous medium of the present invention is water or a mixture of water and one or more other water-soluble organic solvents, especially polar solvents. Typical examples of the organic solvents are monoalcohols, such as methanol, ethanol, propanol etc.; polyhydric alcohols, such as ethylene glycol, diethylene glycol, triethylene glycol, tetraethylene glycol, glycerol, propylene glycol, dipropylene glycol etc.; hydroxyethers, such as ethyleneglycol monomethyl ether, methyleneglycol monoethyl ether, diethyleneglycol monomethyl ether, diethyleneglycol monoethyl ether, diethyleneglycol monobutyl ether, propyleneglycol monomethyl ether, propyleneglycol monoethyl ether etc.; hydroxyether esters, such as ethyleneglycol monomethyl ether acetate, diethyleneglycol monoethyl ether acetate etc.; formamide; N,N-dimethylformamide; dimethylsulfoxide; N-methyl-2-pyrrolidone; and the like.

The azo dye of the present invention should have 1 to 4 phosphorus-containing groups represented by the formula [I]:

[I]

In the formula [I], X represents an oxygen atom or an alkylene group having 1 to 4 carbon atoms, M represents a hydrogen atom, an alkali metal atom (e.g. a lithium atom, a sodium atom or a potassium atom) or $-NH(R)_3$ (wherein R, the same or different, represents a hydrogen atom, an alkyl group having 1 to 3 carbon atoms or a hydroxyalkyl group having 1 to 4 carbon atoms), m represents 0 or 1, and n represents 0 or 1.

Typical examples of the group [I] are

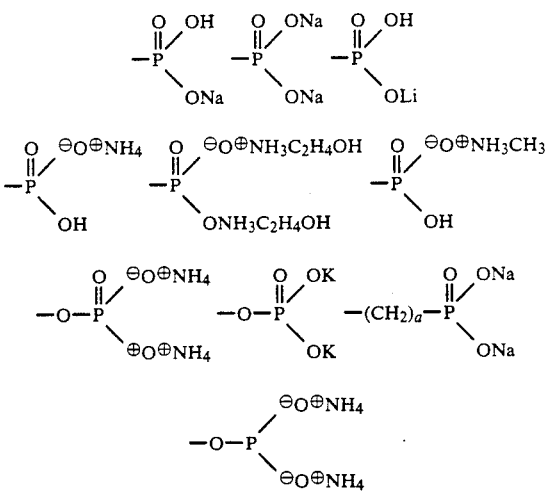

The azo dye should also have a hydroxyl group and/or an amino group, in addition to the phosphorus-containing group [I]. The number of hydroxyl groups and amino groups is not limited, but this number is generally 1 to 4. The azo dye may also contain $-SO_3M$ and/or $-COOM$ wherein M is the same as mentioned above. Typical examples of the azo dyes are acid azo dyes and direct azo dyes. Preferred are monoazo dyes, disazo dyes and trisazo dyes.

The azo dye can be prepared in a method known to the art. For example, the azo dye in which M in the formula [I] is a hydrogen atom is prepared by a diazo-coupling reaction of a diazo component having a phosphonic acid group and a coupling component. Examples of the diazo components having a phosphonic acid group are aminobenzenephosphonic acid, aminonaphthalenephosphonic acid, aminophenylazonaphthalenephosphonic acid, amino(phosphonophenyl)azobenzene, amino(phosphonophenyl)azonaphthalene and a derivative thereof. Examples of the coupling components are phenols, such as phenol, cresol, dioxybenzene etc.); naphthols, such as naphthol, oxynaphthalenesulfonic acid, etc.); aminophenols; aminonaphthols, such as 1-amino-8-naphthol-3,6-disulfonic acid, 2-amino-5-naphthol-7-sulfonic acid, 2-amino-8-naphthol-6-sulfonic acid, 1-amino-8-hydroxy-3-phosphono-6-naphthalene-sulfonic acid etc.); naphthylamines, such as naphthylamine, aminonaphthalenesulfonic acid etc.); pyrazoles; pyrozolones; N-(phosphonoalkyl)anilines; a derivative thereof; and the like.

In the case where M is the group [I] which is not a hydrogen atom, the azo dye thus obtained may be prepared by treating the above azo dye with an alkali metal hydroxide, an alkylamine having 1 to 3 carbon atoms or an alkanolamine having 1 to 4 carbon atoms in water or an aqueous medium at a pH value of at least 9, preferably at about pH 10. Examples of the alkali metal hydroxides are sodium hydroxide, potassium hydroxide, lithium hydroxide and the like. Examples of the alkylamines are methylamine, dimethylamine, trimethylamine, ethylamine, diethylamine, triethylamine, methylethylamine, n-propylamine, isopropylamine and the like. Typical examples of the alkanolamines are ethanolamine, diethanolamine, triethanolamine, propanolamine and the like.

Representative examples of the azo dye of the present invention are:

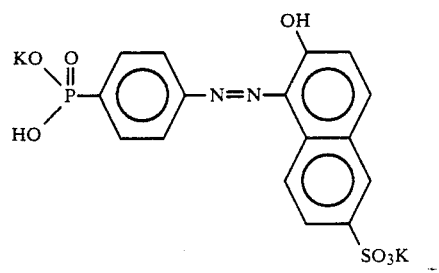

Azo dye 1 (red)

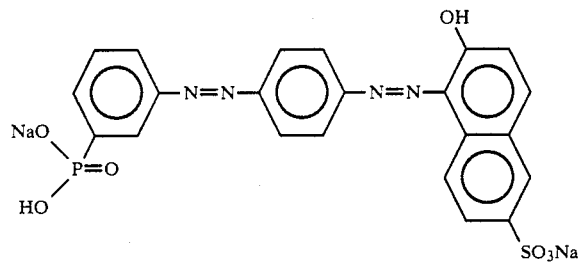

Azo dye 2 (red)

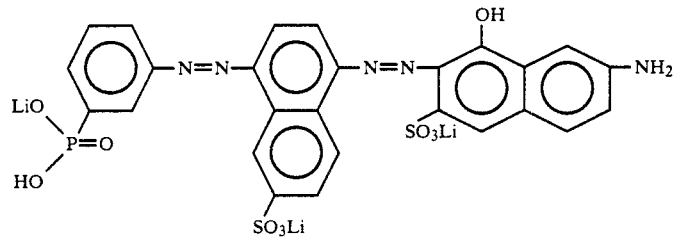

Azo dye 3 (black)

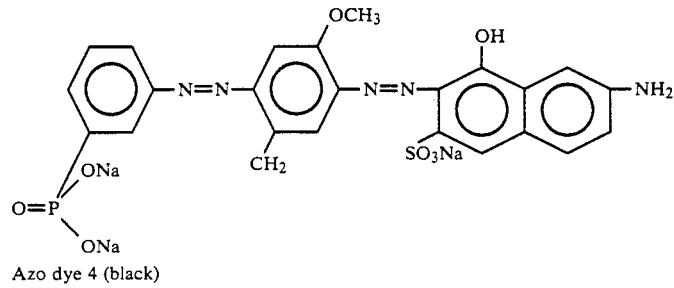

Azo dye 4 (black)

-continued
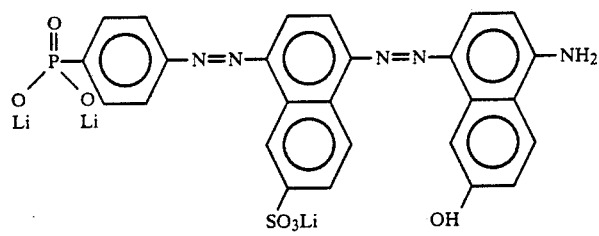
Azo dye 5 (black)
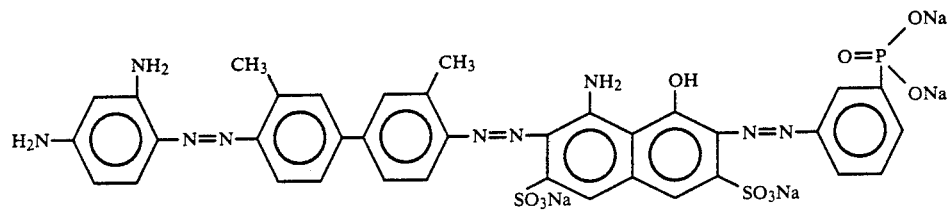
Azo dye 6 (black)
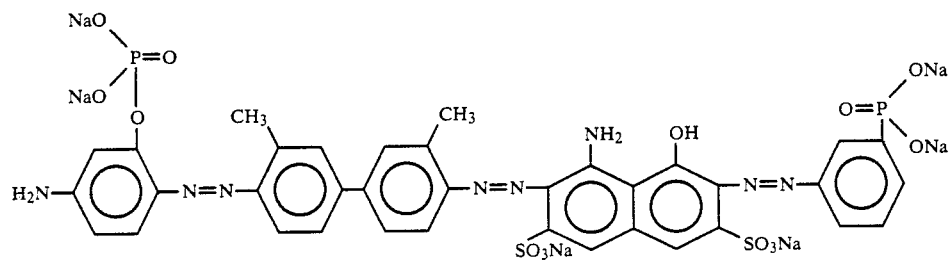
Azo dye 7 (black)
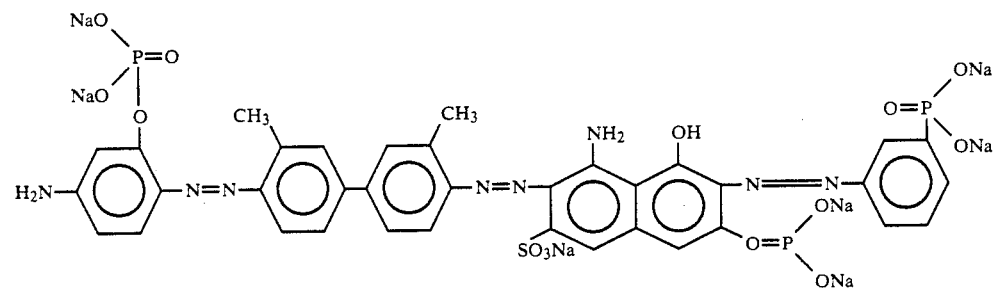
Azo dye 8 (black)
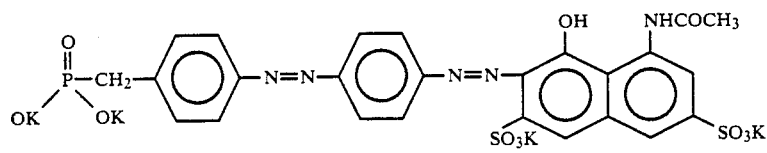
Azo dye 9 (purple)
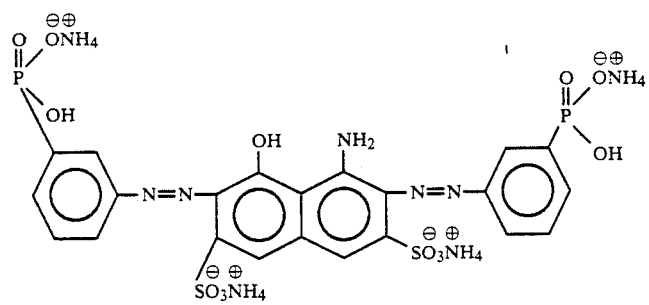
Azo dye 10 (blue)

-continued
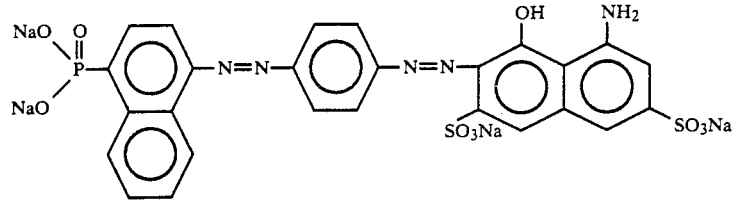
Azo dye 11 (blue)
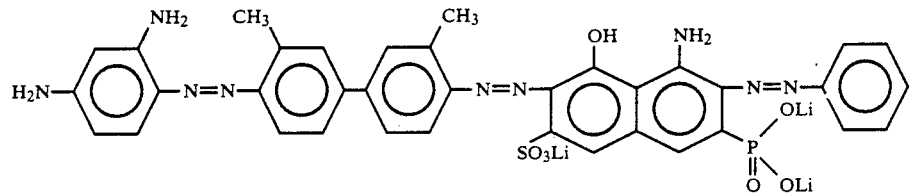
Azo dye 12 (black)
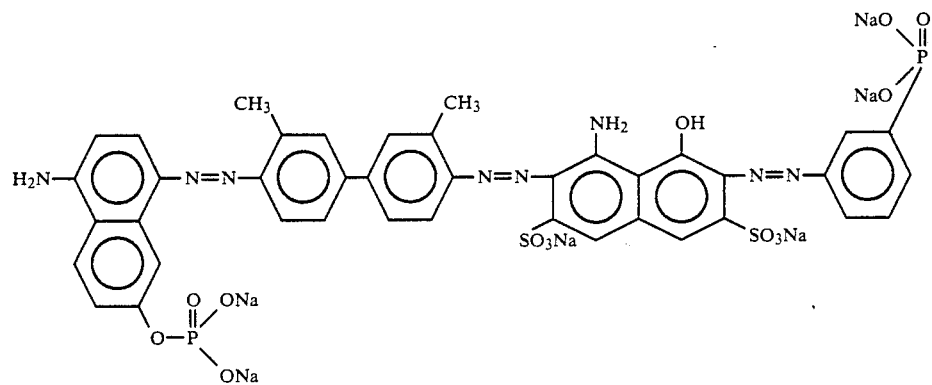
Azo dye 13 (black)
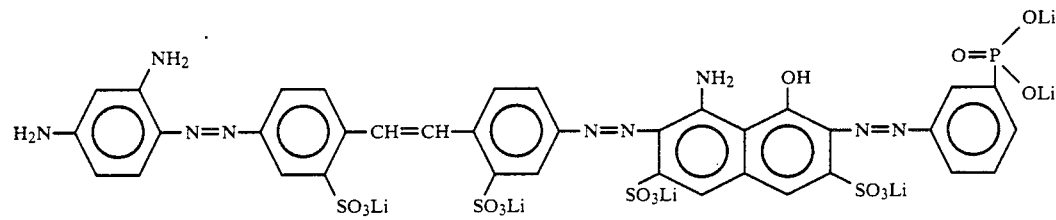
Azo dye 14 (black)
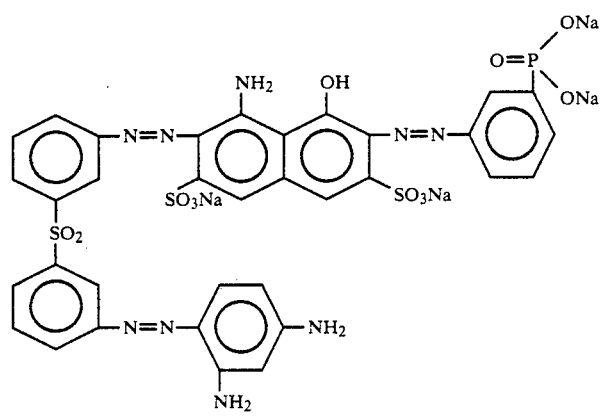
Azo dye 15 (black)
and -continued

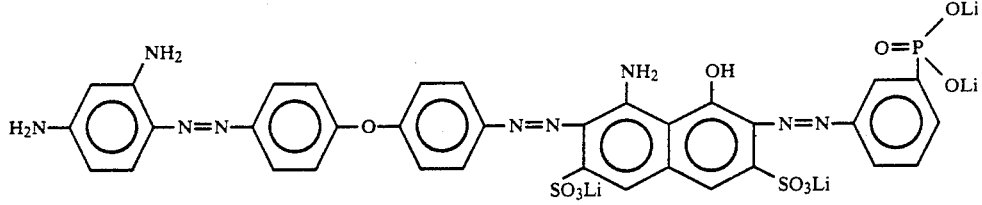

Azo dye 16 (black)

The above azo dye can be used in combination.

The amount of the azo dye is not limited, depending upon its usage and the like. For a ball-point pen, the dye can be present in the aqueous ink composition in an amount of 3% to 15% by weight, preferably 5% to 10% by weight. For ink-jet, it can be present in an amount of 1% to 10% by weight, preferably 1% to 3% by weight.

Beside the above mentioned components, the aqueous ink composition of the present invention may contain additives, such as surfactants, surface tension controlling agents, wetting agents, viscosity modifiers, pH controlling agents, antiseptic agents, corrosion preventive agents and the like.

The surfactants can be anionic, cationic, or nonionic. Typical examples of the surfactants are a fluorine-containing surfactant (e.g. Unidine DS-401 and DS-402 available from Daikin Industries, Ltd., and Megafac F-1420 and F-177 available from Dainippon Ink and Chemicals, Inc.), a silicon-containing surfactant (e.g. Silicon L-7607 available from Nippon Unicar Co., Ltd.), a phosphate surfactant and the like.

Typical examples of the surface tension controlling agents are polyethyleneglycol ether sulfuric acid or an ester thereof, a poly(2-vinylpyridine) derivative, polyoxyethylene alkyl ether, polyoxyethylene alkyl ester and the like.

Typical examples of the wetting agents are polyalkylene glycols, such as polyethylene glycol, polypropylene glycol etc.; alkylene glycols, such as ethylene glycol, propylene glycol, butylene glycol, hexylene glycol etc.; alkyleneglycol monoalkyl ethers, such as diethyleneglycol monomethyl ether, diethyleneglycol monoethyl ether, ethyleneglycol monomethyl ether, ethyleneglycol monoethyl ether etc.; glycerol; and the like.

Typical examples of the viscosity modifiers are polyvinylalcohol, polyvinylpyrolidone, hydroxyethylcellulose, water-soluble acryl resins and the like.

Typical examples of the pH controlling agents are alkali metal hydroxides, such as sodium hydroxide, potassium hydroxide, lithium hydroxide etc.; lower alkanolamines, such as ethanolamine, diethanolamine, propanolamine etc.; ammonium hydroxide; and the like.

Typical examples of the antiseptic agents are phenol, sodium benzoate and the like. Typical examples of the corrosion preventive agents are benzotriazole and ethylenediaminetetraacetate.

The ink composition of the present invention is excellent in lubricating ability and therefore good in writing and recording properties, especially smoothness of writing and recording. When it is applied to ink-jet, the discharging amount is constant, which makes it possible to write or record letters and images more clearly. Also, the composition dissolves dyes well and is stable with time, and therefore substantially no plugging occurs. Writing and recording can be done with a good and stable feeling.

Further, since the dye of the present invention has a hydroxyl group and/or an amino group in addition to the phosphorus containing group, the penetrating and fixing properties onto paper of the ink composition is superior to the conventional dye and it enhances the color value and recording rate.

It is believed that the interaction of the phosphorus-containing group, basic compounds and solvents enhances the solubility of dye. It is believed that the plugging occurs by the formation of insoluble materials which are produced by reacting the metal ions (e.g. $Cu^{2+}$, $Mg^{2+}$, $Fe^{2+}$, etc.) in the ink with carbon dioxide in the air. In the present invention, since the phosphorus-containing group of the azo dye is chemically bonded with the metal ions in preference to the reaction of carbon dioxide produces insoluble materials, the plugging is effective prevented. Further, the dye itself acts as lubricating agent and therefore improves the physical properties.

EXAMPLES

The present invention is illustrated by the following Examples which, however, are not to be construed as limiting the present invention to their details.

EXAMPLES 1 to 15

The components shown in Table 1 were dissolved at 40° C. to 50° C. and filtered with a membrane filter having a pore size of 0.8 micrometer to obtain ink compositions 1 to 15 for a ball-point pen.

The ink was charged in a ball-point pen and subjected to an evaluation test of smoothness of writing and feeling of writing by using a writing tester. The results are shown in Table 1.

COMPARATIVE EXAMPLES 1 to 9

Ink compositions 1' to 9' were prepared as generally described in Examples 1 to 15 using the components shown in Table 1 and the same evaluation was conducted. The results are shown in Table 1.

In Table 1, the other dye compounds (a to i) are compounds having the following formulas;

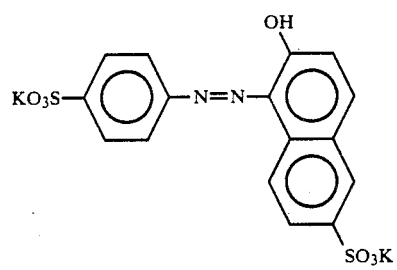
Dye compound a (red)
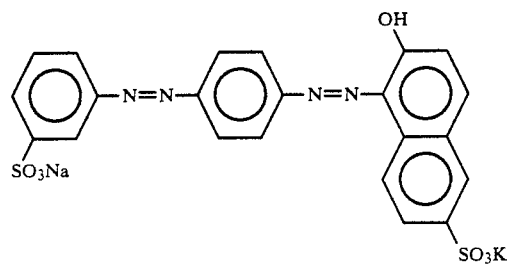
Dye compound b (red)
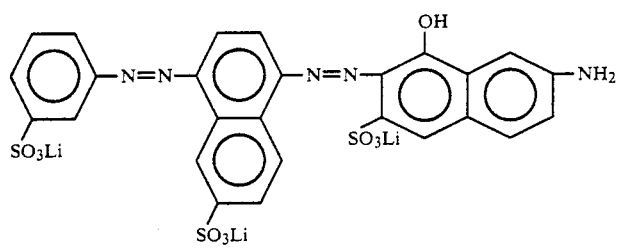
Dye compound c (black)
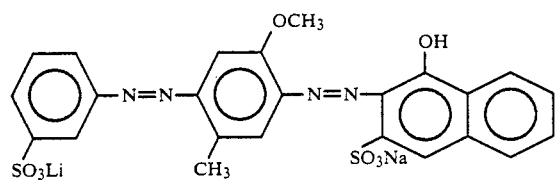
Dye compound d (purple)
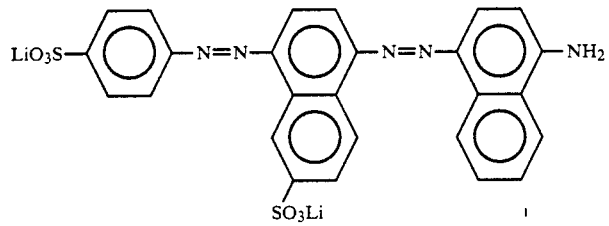
Dye compound e (black)
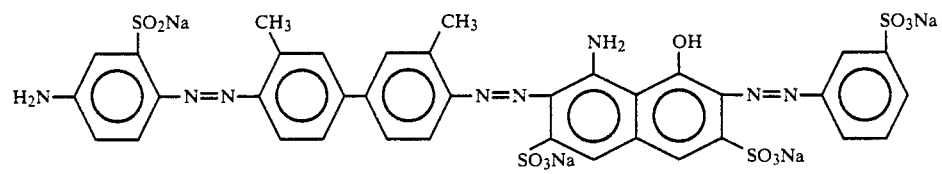
Dye compound f (black)

-continued

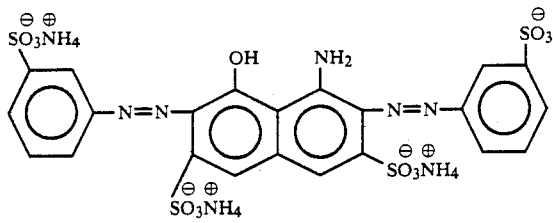

Dye compound g (blue)

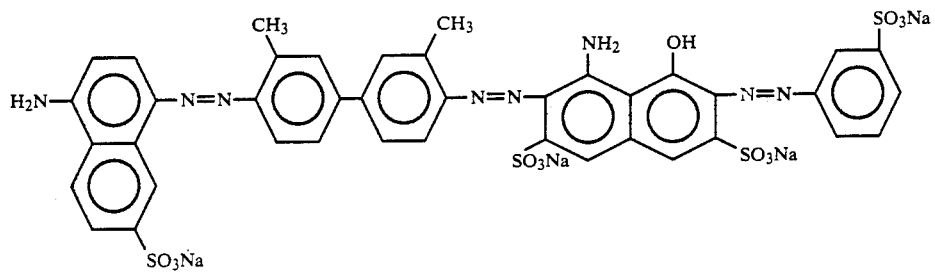

Dye compound h (black)

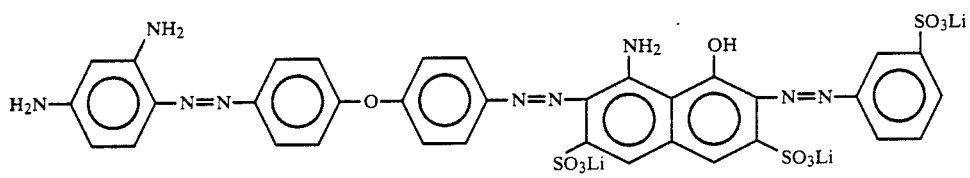

Dye compound i (black)

TABLE 1

| | | Examples | | | | | | | | | | | | | | | Comparative Examples | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 1¹ | 2¹ | 3¹ | 4¹ | 5¹ | 6¹ | 7¹ | 8¹ | 9¹ |
| The azo dye of the present invention (parts of weight) | 1 | 10 | | | | | | | | | | | | | | | | | | | | | | | |
| | 2 | | 10 | | | | | | | | | | | | | | | | | | | | | | |
| | 3 | | | 10 | | | | | | | | | | | | | | | | | | | | | |
| | 4 | | | | 10 | | | | | | | | | | | | | | | | | | | | |
| | 5 | | | | | 10 | | | | | | | | | | | | | | | | | | | |
| | 6 | | | | | | 10 | | | | | | | | | | | | | | | | | | |
| | 7 | | | | | | | 10 | | | | | | | | | | | | | | | | | |
| | 8 | | | | | | | | 10 | | | | | | | | | | | | | | | | |
| | 9 | | | | | | | | | 10 | | | | | | | | | | | | | | | |
| | 10 | | | | | | | | | | 10 | | | | | | | | | | | | | | |
| | 11 | | | | | | | | | | | 10 | | | | | | | | | | | | | |
| | 12 | | | | | | | | | | | | 10 | | | | | | | | | | | | |
| | 13 | | | | | | | | | | | | | 10 | | | | | | | | | | | |
| | 14 | | | | | | | | | | | | | | 10 | | | | | | | | | | |
| | 15 | | | | | | | | | | | | | | | 10 | | | | | | | | | |
| | 16 | | | | | | | | | | | | | | | | | 10 | | | | | | | |
| Other dye compound (parts by weight) | a | | | | | | | | | | | | | | | | | | 10 | | | | | | |
| | b | | | | | | | | | | | | | | | | | | | 10 | | | | | | |
| | c | | | | | | | | | | | | | | | | | | | | 10 | | | | | |
| | d | | | | | | | | | | | | | | | | | | | | | 10 | | | | |
| | e | | | | | | | | | | | | | | | | | | | | | | 10 | | | |
| | f | | | | | | | | | | | | | | | | | | | | | | | 10 | | |
| | g | | | | | | | | | | | | | | | | | | | | | | | | 10 | |
| | h | | | | | | | | | | | | | | | | | | | | | | | | | 10 |
| | i | | | | | | | | | | | | | | | | | | | | | | | | | 10 |
| Etylenglycol | | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| Dietylenglycol | | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Phenol | | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Unidine DS-401 | | 1 | 1 | 1 | 1 | 1 | 1 | 1 | 1 | 1 | 1 | 1 | 1 | 1 | 1 | 1 | | | 1 | 1 | 1 | 1 | 1 | 1 | 1 |
| Water | | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 |
| Color of ink (1) | | R | R | B | B | B | B | B | B | Bu | Bu | B | B | B | B | B | R | R | B | P | B | B | Bu | B | B |
| Writing properties | Written distance (2) | A | A | B | A | A | B | A | A | A | B | B | B | A | A | A | B | B | C | B | B | B | B | C | B |
| | Feeling of writing (3) | A | B | C | B | B | C | B | A | A | B | C | C | A | B | C | B | B | D | C | C | C | B | D | D |

(1) Red = Red, B = Black, Bu = Blue, P = Purple
(2) A distance until skip is seen in a writing test using a writing tester (available from Seiki Kogyo Lab., as MODEL TS-4C-10) according to JIS S 6038. A: 1300~2000 M B: 1000~1300 M C: 700~1000 M D: 500~700 M
(3) A: Smooth and stable feeling B: Smoothness is inferior C: Smoothness and stability are inferior D: Bad feeling

EXAMPLE 16

Two parts by weight of the compound 7 were dissolved in 75 parts by weight of deionized water, to which 10 parts by weight of diethylene glycol and 0.1 part by weight of sodium benzoate were added. The mixture was mixed at 40 to 50° C. to form a uniform solution which was then filtered with a membrane filter having a pore size of 0.8 micrometer and deaerated to obtain an ink composition for ink-jet.

The ink was charged in a vinyl chloride container and subjected to a recording test for a long period of time using an ON-Demand Type recording machine available from Seiko Epson Co., Ltd. as HG-2000. A feed rate of the ink come up with a recording rate, and the ink kept stable and no plugging of a nozzle was observed. Accordingly, recording conditions were constant and stable.

COMPARATIVE EXAMPLE 10

An ink composition was prepared as generally described in Example 16, with the exception that the dye f was employed instead of the compound 7 and the same test was conducted. Discharge of the ink was not uniform resulting in unclear recorded images.

What is claimed is:

1. An aqueous ink composition, which comprises
   (a) an aqueous medium, and
   (b) an effective amount of a monoazo dye, a diazo dye or a triazo dye for improving stability and plugging properties, which have either a hydroxyl group or an amino group, or both a hydroxyl group and an amino group, and which also have 1 to 4 phosphorus-containing groups represented by formula (I):

wherein X represents an oxygen atom or an alkylene group having 1 to 4 carbon atoms, M represents a hydrogen atom, an alkali metal atom selected from the group consisting of a lithium atom, a sodium atom and a potassium atom, or $-NH(R)_3$, wherein R, which is the same or different, represents a hydrogen atom, an alkyl group having 1 to 3 carbon atoms or a hydroxyalkyl group having 1 to 4 carbon atoms, represents 0 to 1, and n represents 0 or 1.

2. The ink composition according to claim 1, which comprises 1 to 4 hydroxyl or amino groups.

3. The ink composition according to claim 1, wherein the azo dye further comprises $-SO_3M$, $-COOM$, or a combination thereof, wherein M is as defined above.

4. The ink composition according to claim 1, wherein the azo dye is an acid azo dye or a direct azo dye.

5. An aqueous ink composition, which comprises
   (a) an aqueous medium, and
   (b) an effective amount of a monoazo dye, a diazo dye or a triazo dye for improving stability and plugging properties, which have either a hydroxyl group or an amino group, or both a hydroxyl group and an amino group, and which also have 1 to 4 phosphorus-containing groups represented by formula (I):

wherein groups represented by formula (I) are selected from the groups consisting of:

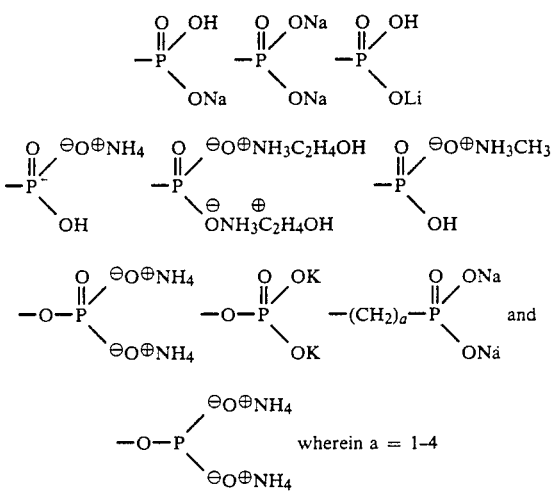

6. An aqueous ink composition, which comprises
   (a) an aqueous medium, and
   (b) an effective amount for improving stability and plugging of an azo dye selected from the group consisting of formulas:

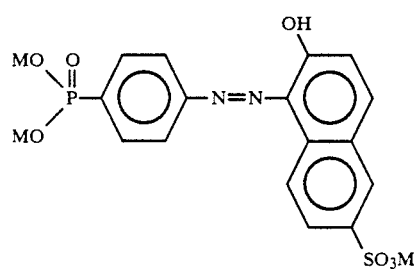

-continued
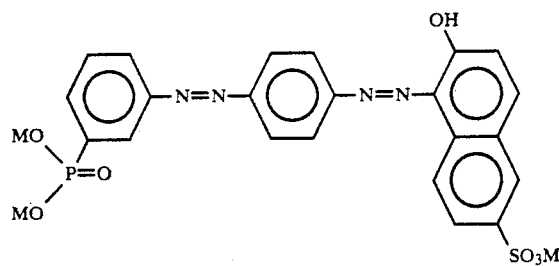
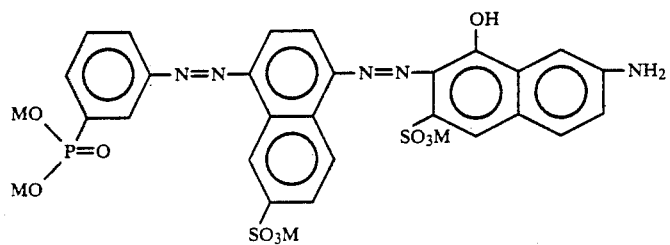
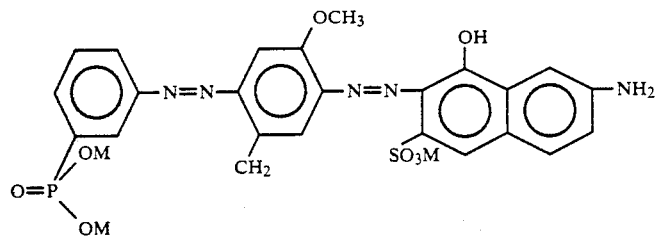
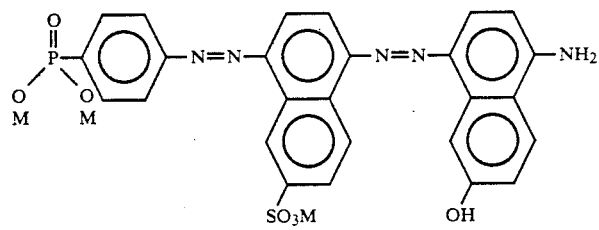
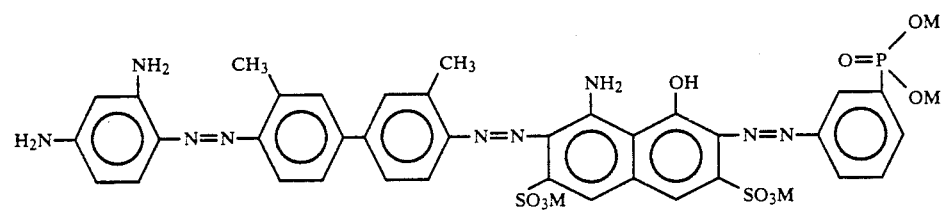
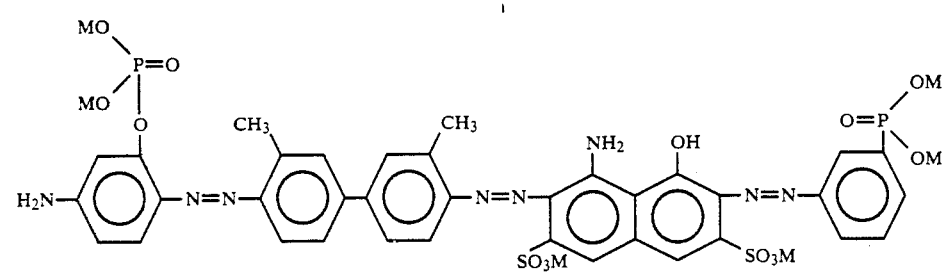

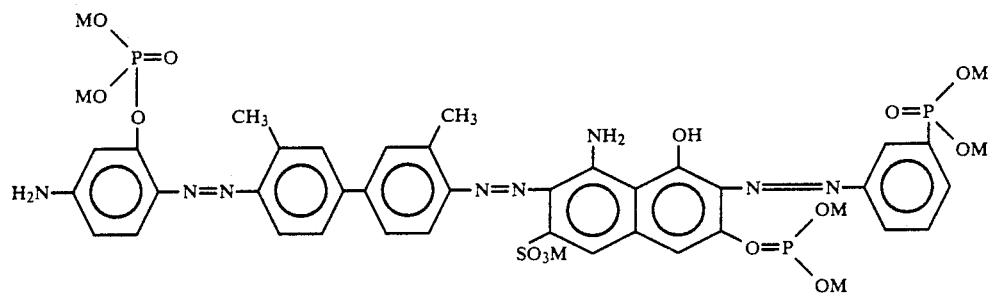
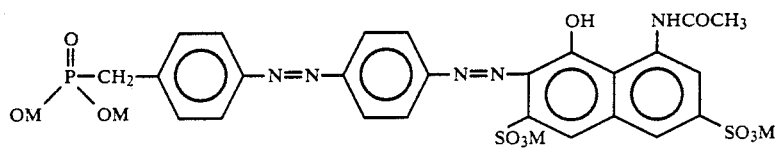
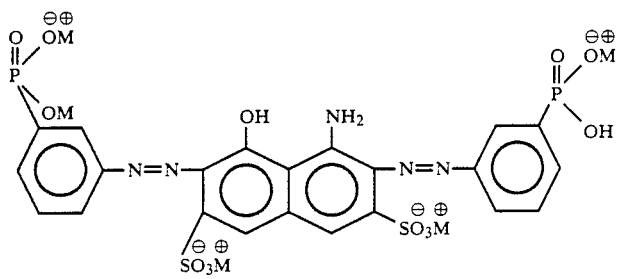
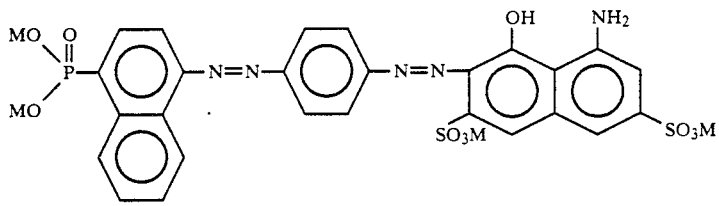
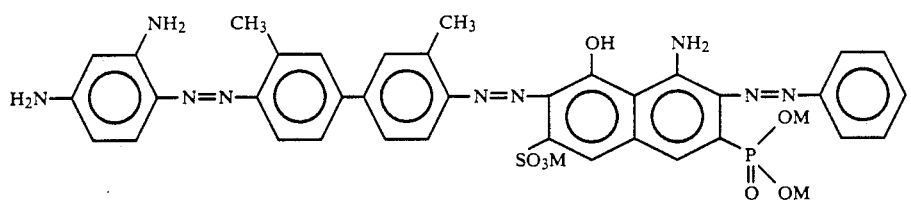
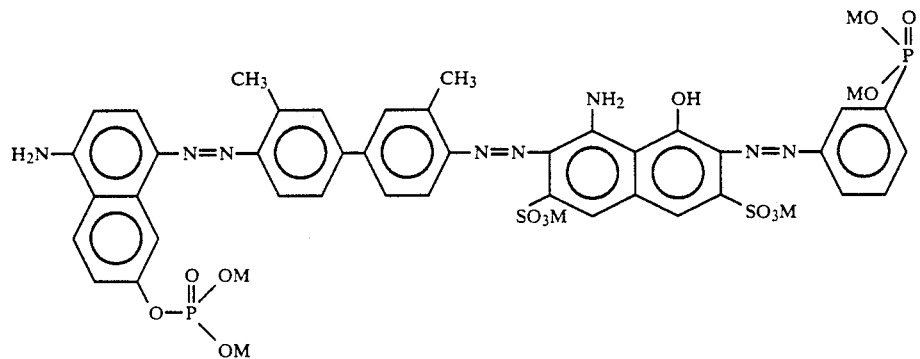

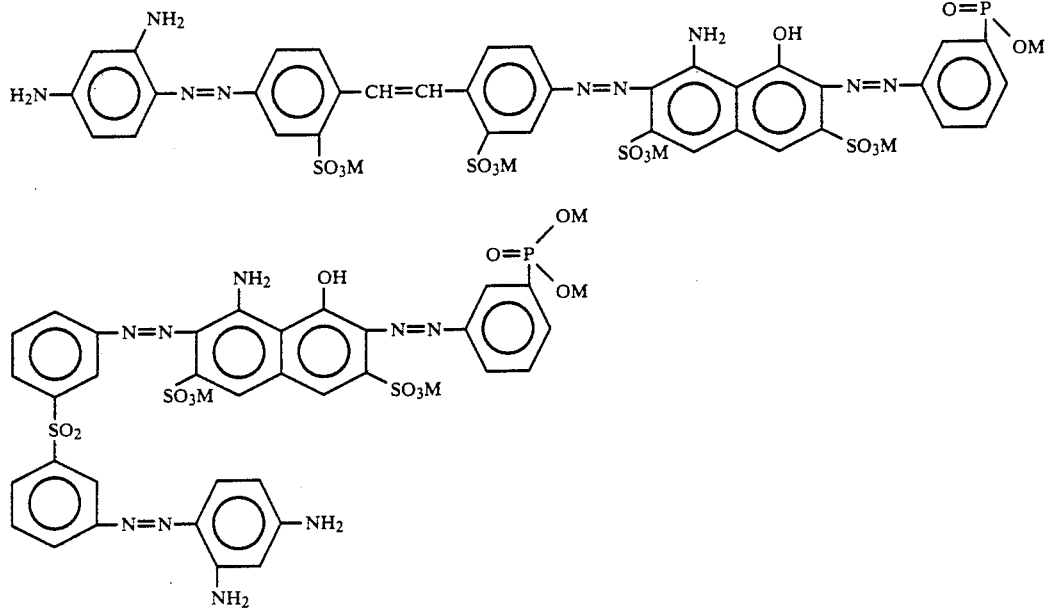

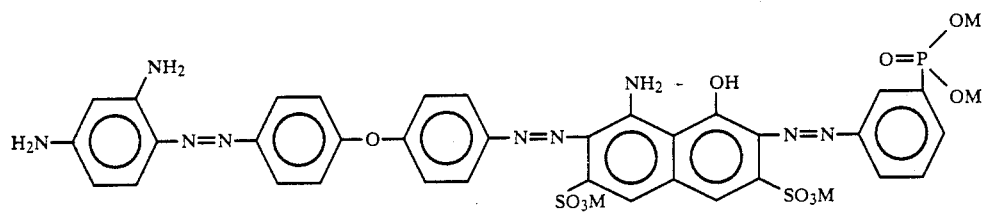

and

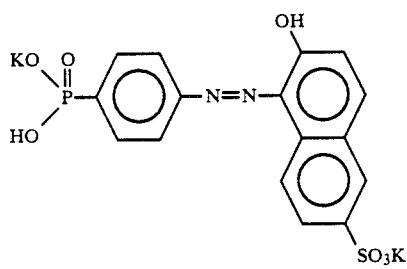

wherein M represents a hydrogen atom, an alkali metal atom selected or —NH(R)$_3$, wherein R, which is the same or different, represents a hydrogen atom, an alkyl group having 1 to 3 carbon atoms or a hydroxyalkyl group having 1 to 4 carbon atoms, where m represents 0 to 1, and n represents 0 or 1.

7. The ink composition according to claim 6, wherein the aqueous medium is water or a mixture of water and an organic solvent.

8. The ink composition according to claim 7, wherein the organic solvent is a polar solvent.

9. The ink composition according to claim 7, wherein the organic solvent is selected from the group consisting of a monoalcohol, a polyhydric alcohol, a hydroxyether, a hydroxyether ester ether, formamide, N,N-dimethylformamide, dimethylsulfoxide, and N-methyl-2-pyrrolidone.

10. The ink composition according to claim 6, wherein said azo dye is present in the ink composition in an amount of 3% to 15% by weight for a ball-point pen.

11. The ink composition according to claim 10, wherein said azo dye is present in an amount of 5% to 10% by weight.

12. The ink composition according to claim 6, wherein the azo dye is present in an amount of 1% to 10% by weight for ink-jet recording.

13. The ink composition according to claim 12, wherein said azo dye is present in an amount of 1% to 3% by weight.

14. An aqueous ink composition, which comprises:
(a) an aqueous medium, and
(b) an effective amount for improving stability and plugging of an azo dye selected from the group consisting of formulas:

-continued
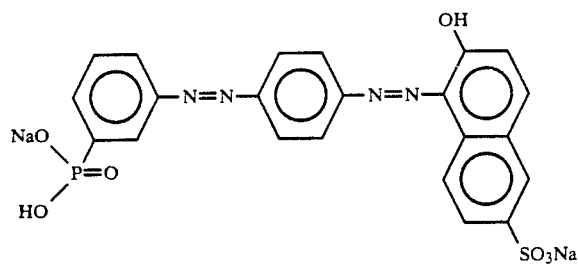
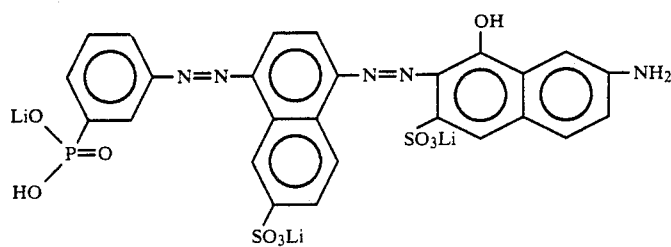
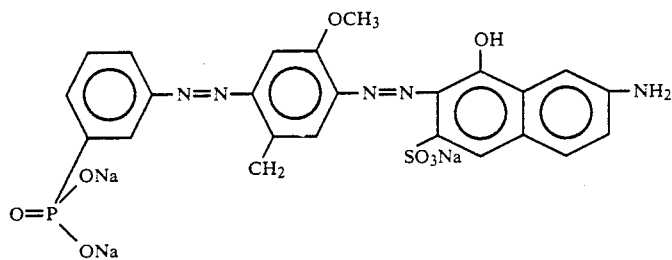
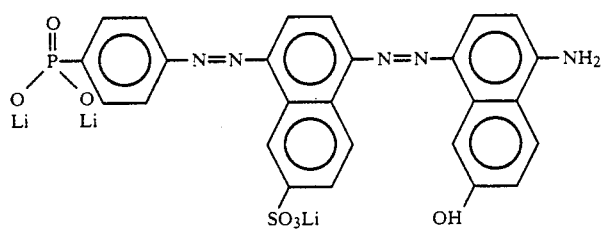
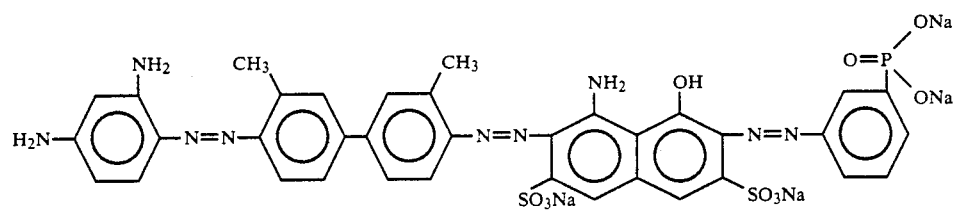
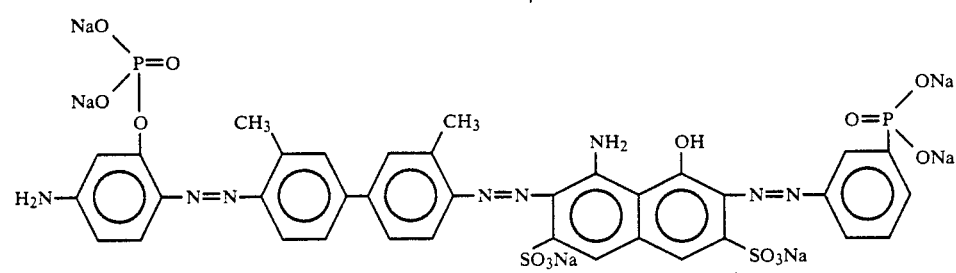

-continued
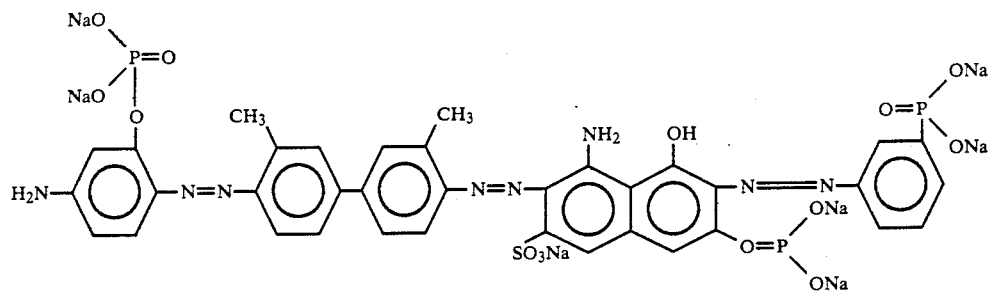
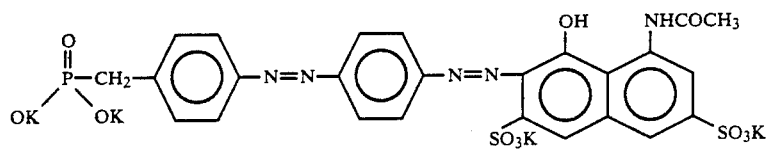
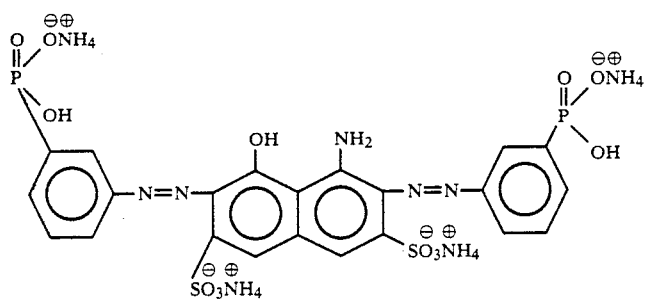
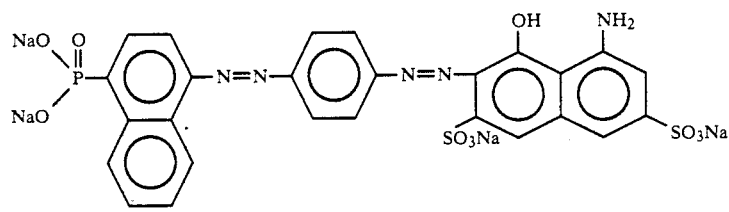
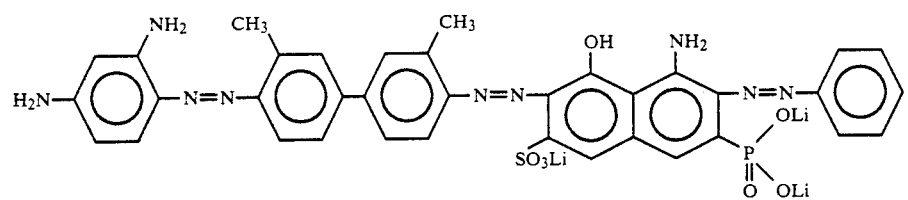
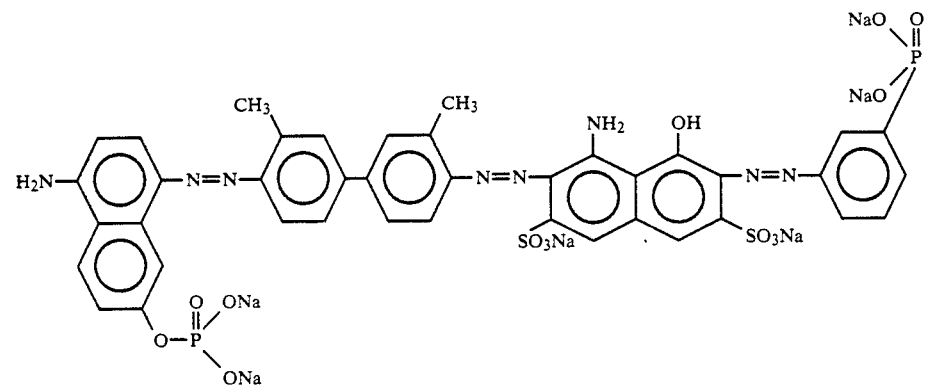

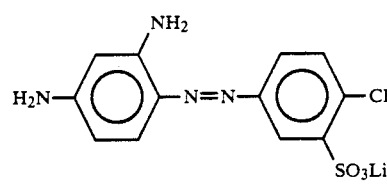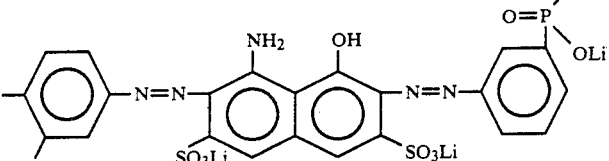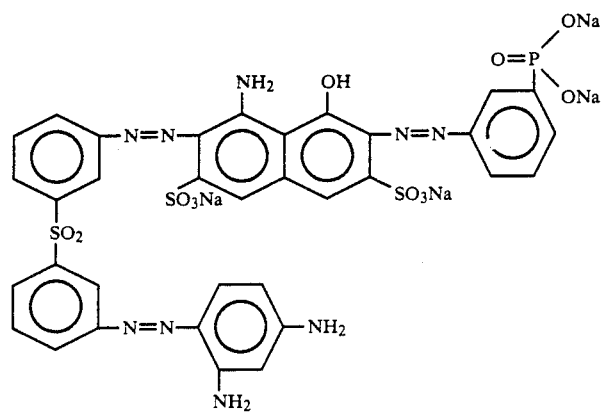
and
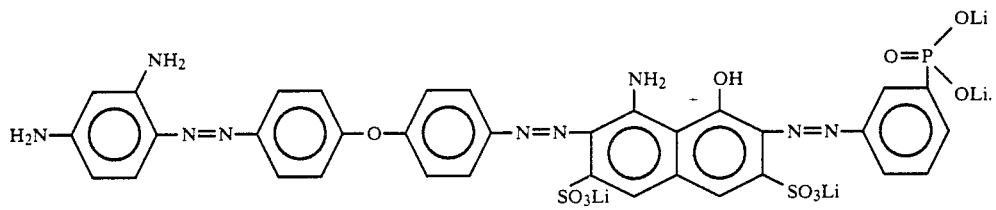
15. An ink for a ball-point pen composed of the composition according to claim 6.
16. An ink for a ink-jet recording composed of the composition according to claim 6.
* * * * *